(12) United States Patent
Marie et al.

(10) Patent No.: US 10,095,053 B2
(45) Date of Patent: Oct. 9, 2018

(54) APPARATUS, ACCESSORY, AND METHOD FOR DETERMINING THE DIAMETER OF A LENS TO BE MOUNTED ONTO A GLASSES FRAME, OR FOR CONTROLLING THE MOUNTING OF A GLASSES LENS ONTO A GLASSES FRAME

(71) Applicant: ESSILOR INTERNATIONAL (COMPAGNIE GENERALE D'OPTIQUE), Charenton-le-pont (FR)

(72) Inventors: Sarah Marie, Charenton-le-pont (FR); Thierry Bonnin, Charenton-le-pont (FR); Ahmed Haddadi, Charenton-le-pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 51 days.

(21) Appl. No.: 15/108,703

(22) PCT Filed: Dec. 22, 2014

(86) PCT No.: PCT/FR2014/053501
§ 371 (c)(1),
(2) Date: Jun. 28, 2016

(87) PCT Pub. No.: WO2015/101735
PCT Pub. Date: Jul. 9, 2015

(65) Prior Publication Data
US 2016/0327814 A1    Nov. 10, 2016

(30) Foreign Application Priority Data
Dec. 30, 2013  (FR) ..................... 13 63689

(51) Int. Cl.
G02C 13/00    (2006.01)
G06T 7/00     (2017.01)
G06T 7/62     (2017.01)

(52) U.S. Cl.
CPC ............ G02C 13/005 (2013.01); G06T 7/001 (2013.01); G06T 7/62 (2017.01)

(58) Field of Classification Search
CPC ........ G02C 13/005; G06T 7/001; G06T 7/602
(Continued)

(56) References Cited

U.S. PATENT DOCUMENTS

| 4,625,418 A | 12/1986 | Joncour et al. |
| 2012/0073153 A1 | 3/2012 | Petri |

(Continued)

FOREIGN PATENT DOCUMENTS

| DE | 10 2011 052 165 A1 | 2/2012 |
| DE | 20 2012 000 167 U1 | 2/2012 |

(Continued)

OTHER PUBLICATIONS

International Search Report, dated Feb. 24, 2015, from corresponding PCT Application.

*Primary Examiner* — Jack Dinh
(74) *Attorney, Agent, or Firm* — Young & Thompson (57) ABSTRACT

An apparatus for determining the diameter of an ophthalmic compensation lens to be mounted onto a spectacle frame, or for controlling the mounting of an ophthalmic compensation lens onto the frame includes: an electronic tablet having a screen; a spectacle frame support having an opening and being suitable for holding the glasses frame in a predetermined position, one surface of the spectacle frame being placed near the surface of the screen; elements for storing at least one graphic image including at least one graphic reference mark associated with the ophthalmic compensa- (Continued)

tion lens and/or with the patient who is to wear the ophthalmic compensation lens mounted onto the frame; elements intended for processing the image and capable of generating a projected image; elements for displaying the projected image onto the screen; and elements for aligning the frame with regards to the projected image displayed on the screen.

20 Claims, 7 Drawing Sheets

(58) Field of Classification Search
USPC .......................................................... 351/204
See application file for complete search history.

(56) References Cited

U.S. PATENT DOCUMENTS

| 2014/0009737 | A1 | 1/2014 | Kweon |
| 2014/0240664 | A1 | 8/2014 | Divo et al. |

FOREIGN PATENT DOCUMENTS

| FR | 2 362 418 | A1 | 3/1978 |
| FR | 2 578 660 | A1 | 9/1986 |
| KR | 10-1300671 | B1 | 8/2013 |
| WO | 2013/045789 | A1 | 4/2013 |

APPARATUS, ACCESSORY, AND METHOD FOR DETERMINING THE DIAMETER OF A LENS TO BE MOUNTED ONTO A GLASSES FRAME, OR FOR CONTROLLING THE MOUNTING OF A GLASSES LENS ONTO A GLASSES FRAME

TECHNICAL FIELD TO WHICH THE INVENTION RELATES

The present invention relates generally to the field of procedures and apparatuses for determining the diameter of a lens intended to be mounted in a spectacle frame or for checking the mounting of a spectacle lens in a spectacle frame.

It relates more particularly to an apparatus comprising a hardware part and a software part, the apparatus being for example installed in a flat-screen electronic tablet, or a touch-sensitive tablet.

TECHNOLOGICAL BACKGROUND

The manufacture of ophthalmic compensation spectacles is based on operations for taking ophthalmic measurements, to determine the values of spherical and/or cylindrical compensation of each eye of a user, as well as on measurements of physiological parameters, such as the monocular pupillary distances, necessary for correct positioning in terms of centering and orientation of the lenses with respect to a spectacle frame.

In the case of the manufacture of progressive lenses, a near vision zone and a far vision zone are furthermore determined for each lens.

Depending on the selected spectacle frame, the optician determines the diameter of the lenses that is suitable for the shape of the outline of the rims of the frame.

The determination of the diameter of the lenses for a spectacle frame may present difficulties on account of a wrap angle of the spectacle frame, i.e. of a general curvature of the frame in the Fraunhofer plane of the user or on account of a dihedral angle of the frame, that is to say of an angle between the respective holding planes of the right and left lenses in the frame. The determination of the diameter of the lenses for a spectacle frame may be further complicated by taking the camber of the lenses into account, that is to say the interior and/or exterior curvature of the ophthalmic compensation lenses.

Ophthalmic compensation lenses are generally provided with erasable markings corresponding to the optical center in far vision (in general a fitting cross), to a reference line indicating the axis of the cylinder (referenced by dashes), in case of cylindrical correction, and, to a near vision zone, in case of progressive lens (in general a small circle).

After mounting the lenses in the frame, it is desirable to verify the proper positioning of the lenses with respect to the frame. For progressive spectacles, it is moreover desirable to verify the location of the near vision and far vision zones, with or without the erasable markings. This check can be performed with or without the user, but it is desirable to show the user the result of this check so as to alert him to the importance of a mounting suited to his morphology and to his vision.

Figure 1:
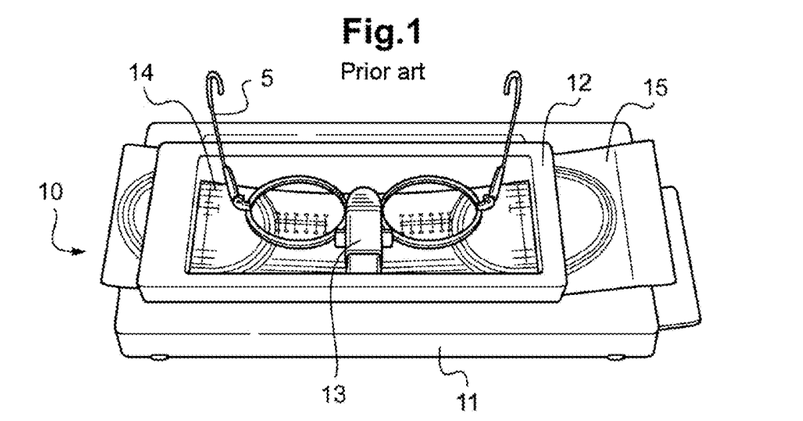
FIG. 1 shows a view of an apparatus for measuring the diameter of the rims of a spectacle frame according to the prior art.

Patent document FR 2578660 describes an apparatus for determining the diameter of the uncut ophthalmic lenses to be fitted in a determined spectacle frame. An apparatus of this type is illustrated in FIG. 1. This type of apparatus is based on the use of printed charts. Each printed chart 15 comprises a plurality of plots corresponding to uncut ophthalmic lenses of different peripheral diameters. The apparatus 10 comprises a plinth 11, a curved chart guide 14 for inserting a printed chart 15, a support 12 specific to the fitting of the spectacle frame 5 to be equipped and an arm 13 movable in translation for holding the spectacle frame in the support 12. This apparatus 10 allows the diameter of the ophthalmic lenses to be determined before mounting. When the curve of the chart guide 14 corresponds to the wrap of the spectacle frame 5, this apparatus 10 makes it possible to reduce the parallax between the spectacle frame 5 and the printed chart 1. However, the wrap of the chart guide 14 does not always correspond to the wrap of the spectacle frame 5, thus resulting in parallax errors. Moreover, a preprinted chart in general represents a plurality of concentric rims, which may be difficult to distinguish, thus giving rise to errors in reading the diameter of the rims of the frame.

Patent document US 2012/0073153 describes another instrument for measuring the diameter of lenses for a spectacle frame, comprising a chart holder of concave shape, a slider making it possible to insert a flexible printed chart into the chart holder and a spectacle frame support. The instrument is provided with a series of preprinted charts representing most lenses as a function of their diameter, outline shape, etc. To measure the diameter of the lenses, the wrapped face of convex shape of a spectacle frame is placed against a printed chart inserted into the concave chart holder. In an advantageous manner, the chart holder comprises several slits, each slit allowing the printed chart to be curved according to a predetermined radius of curvature, so as to fit the wrap of the flexible printed chart to suit the wrap of the frame. This instrument makes it possible to determine the diameter of the lenses intended to be mounted on a spectacle frame before the spectacles are manufactured. This instrument also allows a final verification of the mounting of the lenses on the frame.

However, the prior art apparatuses require a complete series of preprinted charts corresponding to the various diameters and shapes of lenses. Now, the number of frames and of shapes of available lenses multiplies the number of necessary charts. The optician does not always have preprinted charts corresponding to all the available lenses.

Moreover, the prior art apparatuses do not make it possible to check certain mounting parameters, such as the position of the vision zone as a function of the spectacle wearer's pupillary distance. Accordingly, complementary measurements are generally used, for example via another measurement instrument equipped with a video camera. The optician generally acquires a first image of the wearer wearing the spectacle frame before the lenses have been mounted, and then a second image of the wearer wearing the spectacle frame after the lenses have been mounted.

Figure 2:
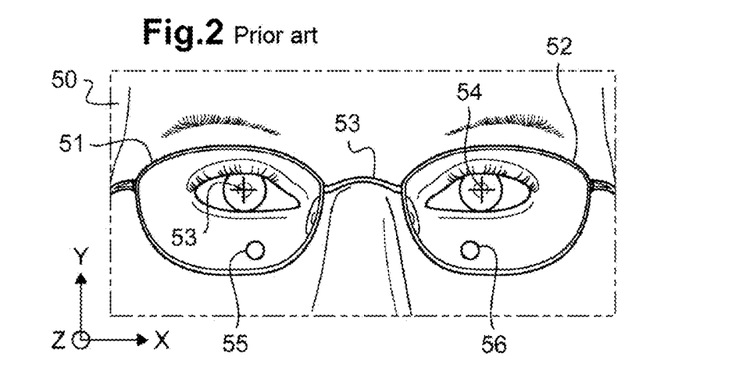
FIG. 2 shows an image as a face-on view of a user wearing a demonstration spectacle frame.

Thus, FIG. 2 shows a first image 50 of a user wearing a demonstration spectacle frame, furnished with lenses with no marking and no optical power, for the measurement of the user's physiological parameters. In FIG. 2, the user looks straight ahead, in far vision. The measurement instrument makes it possible, by known techniques, to determine in the first image 50: the center of the pupil 53 of the right eye in far vision, referenced by a cross, and the near vision zone 55 of the right eye, referenced by a circle with respect to the image of the right rim 51 of the frame. Likewise, the following are determined with respect to the image of the left rim 52 of the frame: the center of the pupil 54 of the left eye in far vision, referenced by a cross, and the near vision zone 56 of the left eye, referenced by a circle. The XY plane of FIG. 2 is referenced in an XYZ orthonormal coordinate system, the X axis passing through the centers of the pupils 53, 54 of the two eyes. By calibration, the image 50 of FIG. 2 makes it possible to measure for example the interpupillary distance or the mounting height of a progressive lens with respect to the lower edge of the rim of the frame.

Figure 3:
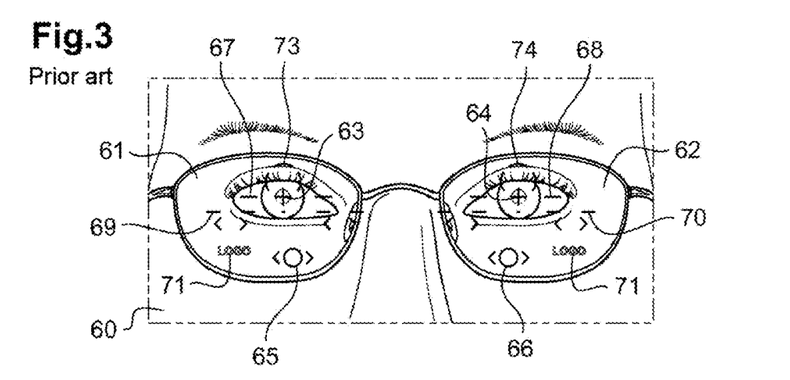
FIG. 3 shows an image as a face-on view of a user wearing a spectacle frame after mounting of the ophthalmic compensation lenses.

FIG. 3 shows a second image 60 of a user wearing the same spectacle frame as in FIG. 2, after mounting of progressive lenses 61, 62. Various reference markers appear on the lenses: centering reference markers (centering crosses 63, 64), markers indicating the far vision zones (discontinuous circles 73, 74), markers indicating the near vision zones (continuous circles 65, 66), and horizontal lines 67, 68, 69, 70. The image 60 of FIG. 3 makes it possible to check the mounting of the lenses in the spectacle frame worn by the user. The image 60 of FIG. 3 makes it possible to verify that the edging, the centering and the positioning of the lenses are correct or to detect possible centering and/or mounting errors.

In the case where the mounting of the lenses is satisfactory, the image 60 allows the optician to show the user that the selection of the lenses and their mounting are suited to the personalized vision of this user. The physical reference markers, in general temporary markings 63-71, are then erased by the optician.

In case of defective mounting, the optician performs the necessary modification, and then in general undertakes a new checking step, through a new image acquisition of the wearer with the spectacle frame after correction of the mounting of the lenses. However, these steps of successive checks are time-consuming for the wearer and the optician.

One of the objectives of the invention is to propose an apparatus and a method for determining the diameter of a spectacle lens that is easily configurable for a spectacle frame as a function of the diameter and of the shape of the available lenses.

Another objective of the invention is to propose an apparatus and a method for checking the mounting of a lens on a frame, not requiring the presence of the spectacle wearer.

SUBJECT OF THE INVENTION

In order to remedy the aforementioned drawback of the prior art, the present invention proposes an apparatus for determining the diameter of an ophthalmic compensation lens intended to be mounted in a spectacle frame or for checking the mounting of an ophthalmic compensation lens in a spectacle frame.

More particularly, there is proposed according to the invention an apparatus comprising:
  an electronic tablet having a screen,
  a spectacle frame support, the spectacle frame support having an opening and being suitable for holding said spectacle frame in a determined position, a face of the spectacle frame being placed in the vicinity of the surface of the screen, and
  means for storing at least one graphical image comprising at least one graphical reference marker associated with the ophthalmic compensation lens and/or the patient intended to wear the ophthalmic compensation lens mounted in said frame;
  means for processing said image which are suitable for generating a projected image;
  means for displaying said projected image on the screen, and
  means for aligning said frame in relation to the projected image displayed on the screen,
  said electronic display means being configured to allow an operator to visually determine a diameter of lens intended to be mounted in said spectacle frame by projecting at least one rim of the frame via said opening in relation to the position of the at least one corresponding graphical reference marker in the projected image displayed on the screen or to visually check the mounting of an ophthalmic compensation lens in said spectacle frame by projecting a physical reference marker associated with the lens mounted in said frame in relation to the position of the at least one corresponding graphical reference marker in the projected image displayed on the screen.

Other nonlimiting and advantageous features of an apparatus for determining the diameter of an ophthalmic compensation lens intended to be mounted in a spectacle frame or for checking the mounting of an ophthalmic compensation lens in a spectacle frame in accordance with the invention are the following:
  the apparatus furthermore comprises a fixing device linked mechanically to the spectacle frame support, the fixing device comprising a fixing clamp intended to be fixed on an edge of the electronic tablet or a case suitable for surrounding the electronic tablet, the case comprising an opening facing the screen of the electronic tablet;
  the spectacle frame support is fixed with respect to the screen, and the alignment means comprise image processing means suitable for modifying the displayed graphical image so as to correct a parallax error between the projection of the frame through the opening and the graphical image displayed on the screen;
  the spectacle frame support comprises opto-mechanical alignment reference markers and the electronic display means are configured to display corresponding alignment graphical reference markers in the image displayed on the screen;
  the spectacle frame support is mounted movable in rotation about an axis parallel to the screen, so as to reduce a parallax error between the portion of the frame and the displayed image;
  the screen is a flat screen, a curved screen having an outwardly concave curvature or a flexible screen;
  the spectacle frame support comprises a plurality of fixing clamps or lugs intended to receive and to hold the spectacle frame;
  the spectacle frame support comprises a bearing surface and a movable component suitable for bearing against a median bridge of said spectacle frame and so that a face of said spectacle frame comes into contact with said bearing surface, the spectacle frame being held by pressure between the movable component and the bearing surface.

The invention also proposes an electronic tablet accessory for determining the diameter of a lens intended to be mounted in a spectacle frame or for checking the mounting of a lens in a spectacle frame, said accessory comprising:
  a fixing device intended to be fixed on an electronic tablet having a screen; and
  a spectacle frame support linked mechanically to the fixing device, the spectacle frame support being suitable for holding said spectacle frame in a fixed position in the vicinity of the screen,
  the fixing device and the spectacle frame support having at least one opening between a rim of said frame in said fixed position, and the surface of the screen, when the fixing device is fixed on the electronic tablet, said opening being suitable for allowing an operator to view a graphical image displayed on the screen of the tablet by projection through said opening, so as to determine the diameter of a lens intended to be mounted in a rim of said spectacle frame or to check the mounting of a lens in said spectacle frame.

According to particular aspects, the electronic tablet accessory comprises means for rotating the frame support around one or two directions of the surface of the screen, so as to compensate a pantoscopic angle of the frame, an angle of wrap of the frame or a dihedral angle of the frame.

The invention also proposes a method for determining the diameter of an ophthalmic compensation lens intended to be mounted on a spectacle frame, the method comprising the following steps:

arranging a spectacle frame in a predetermined position on a spectacle frame support of an apparatus according to one of the embodiments described;

displaying on the screen of the electronic tablet at least one graphical image of a lens outline of determined diameter and determined position;

visually comparing by projection a rim of said frame and the graphical image of the lens outline displayed on the screen of the electronic tablet;

deducing therefrom a diameter of ophthalmic compensation lens intended to be mounted on said spectacle frame.

The invention also proposes a procedure for checking the mounting of at least one ophthalmic compensation lens in a spectacle frame, said lens comprising at least one physical marking, the checking procedure comprising the following steps:

recording at least one digital image comprising at least one graphical reference marker representative of a face-on view of the ophthalmic compensation lens and/or of the patient intended to wear the ophthalmic compensation lens mounted in said frame;

digital processing of said image, suitable for generating a projected image;

displaying said projected image on a digital tablet screen;

positioning the frame comprising said at least one ophthalmic compensation lens, a face of the lens being placed on the surface of the screen of the tablet, aligning said frame in relation to the projected image displayed on the screen so as to allow a visual check of the position of the at least one physical marking by projection in relation to the position of the at least one corresponding graphical reference marker in the projected image displayed on the screen.

According to particular aspects of the checking procedure:

said at least one digital image is a photographic image of the patient wearing the spectacle frame and the at least one graphical reference marker comprises a graphical reference marker from among: a position of corneal reflection, a line passing through the centers of the two eyes, a near vision zone, a far vision point, a progressive lens corridor, a horizontal line, an optical center;

said at least one digital image comprises a template for checking the dimension of the lens and/or the shape of the outline of the lens, an image of the spatial distribution of refractive power of the ophthalmic compensation lens and/or an image of the spatial distribution of distortion of the ophthalmic compensation lens;

the procedure furthermore comprises a step of displaying a graphical tool by superposition on the displayed projected image, the graphical tool being suitable for allowing a distance between the position of the at least one manufacturing marking and the position of the at least one corresponding graphical reference marker in the projected image displayed on the screen to be evaluated;

the procedure furthermore comprises an additional step of recording a result of said check preferably in the form of a recording of an image of the frame comprising the ophthalmic compensation lens and the manufacturing markings, the frame being positioned on the screen of the digital tablet displaying the projected image and the at least one corresponding graphical reference marker;

the frame comprises two ophthalmic compensation lenses and the checking procedure is applied simultaneously to the two lenses or successively to each of the two lenses.

DETAILED DESCRIPTION OF ONE EXEMPLARY EMBODIMENT

The description which follows with regard to the appended drawings given by way of nonlimiting examples will clearly elucidate the essence of the invention and the manner in which it may be carried out.

In the appended drawings:

FIG. 11A shows an apparatus for measuring the diameter of the rims of a spectacle frame according to a fourth embodiment of the invention, and FIG. 11B a detail of the fixing clip for this apparatus;

DEVICES

Figure 4:
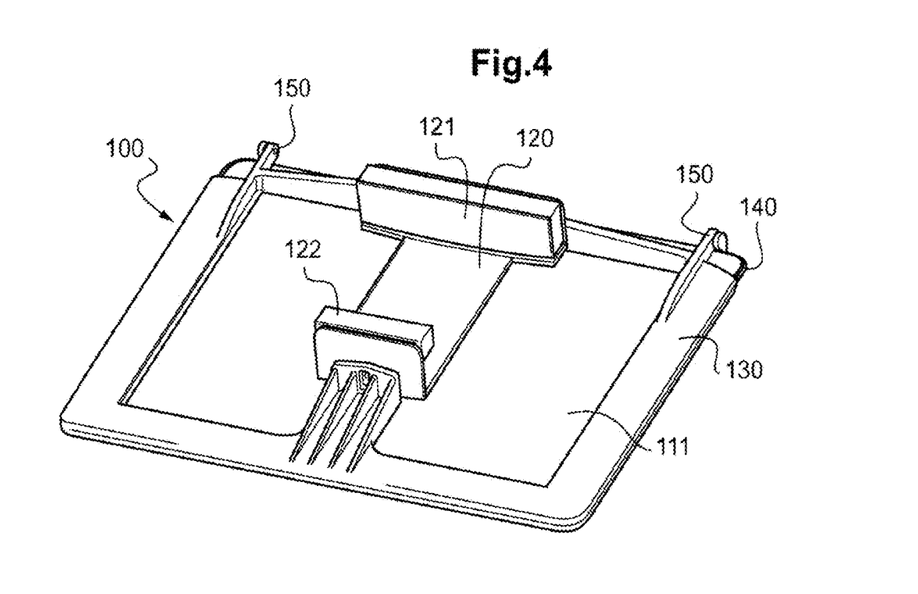
FIG. 4 schematically shows a perspective view of an apparatus for measuring the diameter of the rims of a spectacle frame according to a first embodiment of the invention.

FIG. 4 shows a perspective view of an apparatus for measuring the diameter of the lenses for a spectacle frame or for checking the mounting of lenses in a spectacle frame according to a first embodiment of the invention. The apparatus 100 comprises an electronic tablet 110 with flat screen 111 and a spectacle frame support. In a particularly advantageous manner, the electronic tablet 110 is a touch-sensitive tablet.

In the first embodiment, the spectacle frame support comprises a plate 120, a first bearing surface 121, arranged perpendicularly to the plate 120 and a holding component 122. For example, the holding component 122 slides so as to hold the spectacle frame by pinching against the bearing surface 121. The frame support thus makes it possible to hold a spectacle frame in a position where the holding plane of the lenses is in proximity to the plate 120. Preferably, the plate 120 is a thin plate (a few millimeters thick) and is transparent.

The frame support is linked mechanically to a case 130. The case 130 is fixed on the electronic tablet. The case 130 delimits a central opening the size of which is preferably close or equal to the size of the flat screen 111. In an advantageous manner, the opening of the case 130 has a length of between 150 and 180 cm and a width of between 100 and 140 cm. Preferably, the length of the opening of the case 130 is greater than the distance between the two temples of the spectacle frame that one wishes to measure or check. For example, the frame support is fixed in the middle of the case, lengthwise, as illustrated in FIG. 4. Thus, the spectacle frame support is disposed in the vicinity of the surface of the flat screen 111.

Figure 5:
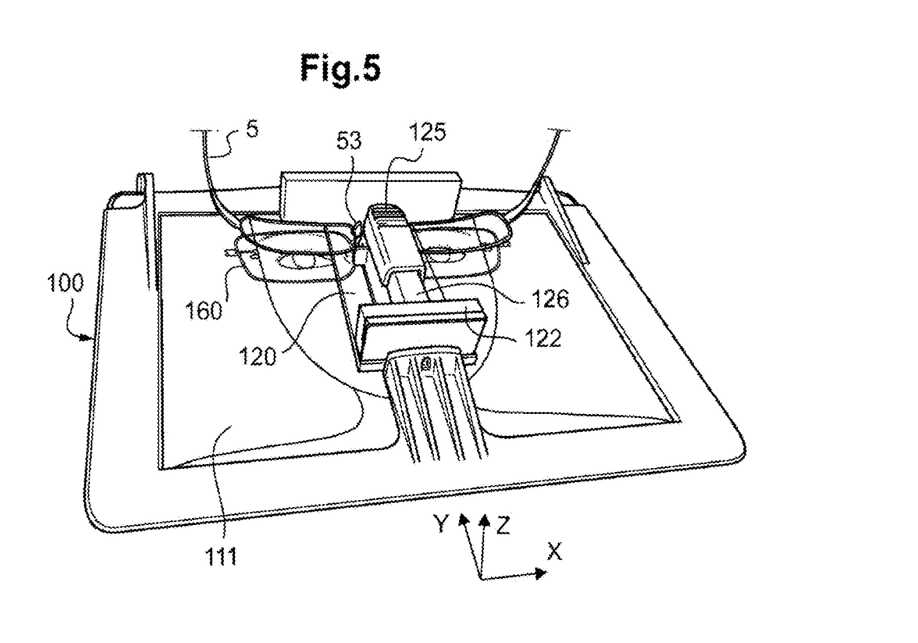
FIG. 5 shows another perspective view of an apparatus for measuring the diameter of the rims of a spectacle frame according to the first embodiment of the invention, with display of an image of the user wearing the spectacle frame.

In the example illustrated in FIGS. 4-5, the electronic tablet 110 is embedded between a lower shell 140 and the case 130. The lower shell 140 and the case 130 are linked by hinges 150. The assembly formed by the shell 140, the case 130 and the spectacle frame support is thus fastened to the screen 111 for the desired measurement or check, but this assembly remains removable from the electronic tablet.

Alternatively, the case 130 can be fixed to the electronic tablet by flanges thereof which snap-fit onto the edges of the electronic tablet surrounding the screen, in a permanent or removable manner.

The plane of the screen 111 is the plane XY.

FIG. 5 illustrates an exemplary use of the apparatus of FIG. 4 for checking a spectacle frame equipped with lenses. The spectacle frame 5 is arranged on the frame support. The rims of the frame 5 and/or the lenses make contact with the plate 120. The holding component 122 is equipped with a head 125 mounted on a guide rail 126. The head 125 is movable in translation along the guide rail 126 along the Y axis so as to bear against the median bridge 53, or nose bridge, of the frame 5. A restoring system, comprising for example a compression spring, makes it possible to hold the spectacle frame in a fixed position. Thus, the frame 5 is held in a fixed position, the sagittal plane of the frame 5 being perpendicular to the surface of the screen, the frame 5 being wedged by the pressure on the one hand of the rims against the bearing surface 121 and on the other hand of the median bridge 53 against the head 125.

The flat screen 111 of the electronic tablet 110 makes it possible to display a prerecorded image. The operator can thus compare, by projection, the spectacle frame 5 arranged on the frame support and the displayed image 160 on the screen 111 of the electronic tablet.

In the example of FIG. 5, before the lenses are mounted in the frame, a first face-on view of the wearer with the spectacle frame is recorded.

The displayed image is for example obtained from a photographic image of the face of the wearer wearing the demonstration frame, with no ophthalmic compensation lens. For example, the image is taken by means of a video camera of a measurement system of Visioffice type. During image acquisition, the operator ensures that the acquisition plane is vertical and perpendicular to the sagittal plane of the wearer. In an advantageous manner, during this image acquisition, a bar furnished with graphical reference markers is fixed on the frame, to allow scaling of the image and a distance measurement, for example measurement of inter-pupillary distance.

Figure 6:
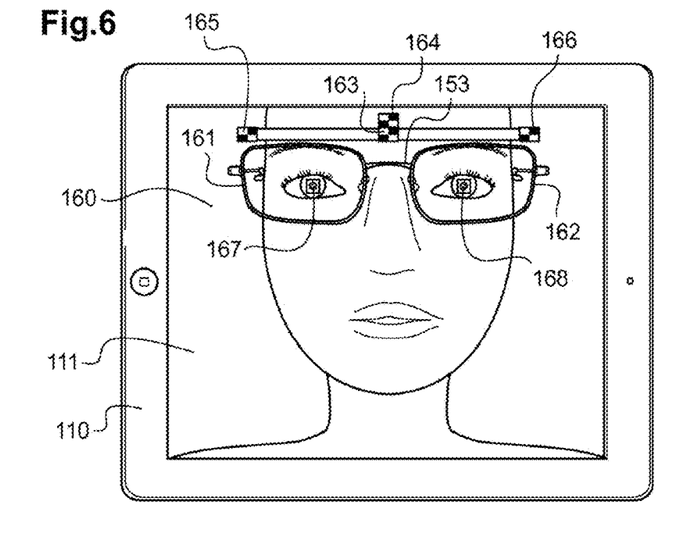
FIG. 6 shows another view of an image of the user wearing the spectacle frame, furnished with a clip, on the apparatus for measuring the diameter of the rims of a spectacle frame of FIGS. 4-5.

Thus, as illustrated by way of example in FIG. 6, an image 160 comprising the image of the right 161, respectively left 162, rims of the frame, the image of the median bridge 153, the position of the pupil of the right eye 167, respectively the position of the pupil of the left eye 168 of the wearer is displayed on the screen 111. Advantageously, the image 160 comprises several graphical reference markers 163, 164, 165, 166 associated with the image of the spectacle frame. Since the size of the screen 111 is known, the graphical reference markers make it possible to display an image 160 with the dimensions of the actual size of the frame. Alternatively, access to a complementary measurement of the inter-pupillary distance of the wearer in far vision allows a rescaling l of the image 160, on the basis of the positions of the images of the pupils of the wearers right 167 and left 168 eye.

In the case where no image is available of the face of the wearer wearing the frame, a computerized system is used to generate an image comprising the frame and the positioning of the eyes, for example with the help of a database of spectacle frames and of a database of centering measurements of the eyes of the wearer.

We will detail hereinbelow the steps for processing this image, to allow alignment between the spectacle frame 5 and the displayed image, as well as to correct parallax effects due to the wrap of the spectacle frame and/or to the camber of the lenses.

Figure 7:
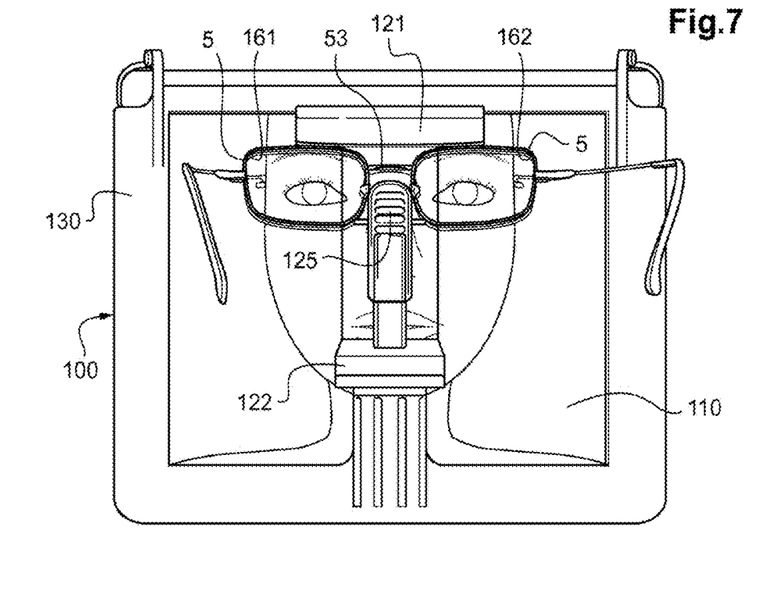
FIG. 7 shows another view of an image of the user, of the apparatus and of the frame laid on the apparatus according to the 1st embodiment.

FIG. 7 shows another view of the apparatus and of the frame laid on the apparatus according to the first embodiment. The case 130 is fixed on the electronic tablet. The frame 5 is laid on the frame support. The head 125 of the holding component 122 bears against the median bridge 53 of the frame 5, in such a way that the rims of the frame come into abutment against the bearing surface 121. Thus, the sagittal plane of the frame 5 is perpendicular to the surface of the screen. The image of the user wearing the spectacle frame is displayed on the screen 111, the display system taking account of the projection of the image on the surface of the screen. By projection, as illustrated in FIG. 7, an operator can visually compare the position of the frame 5 in relation to the image projected on the surface of the screen. The operator can thus undertake a fine adjustment of the relative position of the frame with respect to the displayed image, by modifying the position of the frame in the support and/or by modifying the position and the orientation of the image displayed on the screen. The operator can then make a visual evaluation of the position of the reference markers associated with the frame 5 or the lenses mounted in this frames in relation to the graphical reference markers displayed on the image projected on the screen.

Figure 8:
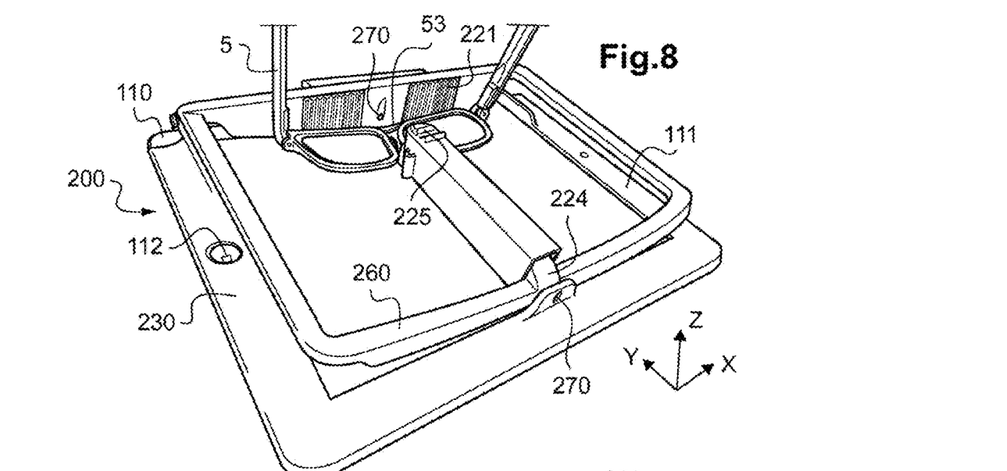
FIG. 8 shows a perspective view of an apparatus for measuring the diameter of the rims of a spectacle frame according to a second embodiment of the invention.

FIG. 8 schematically shows a second embodiment of the invention of an apparatus 200 for measuring the diameter of the rims of a spectacle frame or for checking the mounting of ophthalmic compensation lenses in a spectacle frame.

The checking or measuring apparatus 200 comprises a touch-sensitive tablet 110 with a flat screen 111. A case 230 having an opening with the dimensions of the flat screen 111 is fixed on the touch-sensitive tablet 110. The case 230 can comprise other openings, such as an opening 112 allowing the operator to access a control key or a video camera integrated into the electronic tablet.

The apparatus 200 also comprises a frame support 260, which comprises a bearing surface 221, a guide rail 224 and a head 225. The bearing surface 221 is advantageously tangential to a parallel to an edge of the screen 111. The guide rail 224 is substantially transverse to the bearing surface 221 and disposed in the middle of the frame support 260. The head 225 is mounted movable in translation along the guide rail 224, in such a way that the head 225 bears against the median bridge 53 of the spectacle frame 5, while a surface tangential to the rims of the frame bears against the bearing surface 221. Preferentially, anti-slip pads are disposed on the holding surface 221 and/or on the head 225 to prevent the spectacle frame from slipping. A system for holding in position, for example using a compression spring, makes it possible to apply a force between the guide rail 224 and the head 225, in such a way that the head exerts a pressure force on the frame. Thus, the spectacle frame 5 is held in a fixed position with respect to the frame support 260, the sagittal plane of the frame being perpendicular to the surface of the screen.

In the second embodiment, the frame support 260 is linked mechanically to the case 230, by way of a rotation pin 270.

Figure 9:
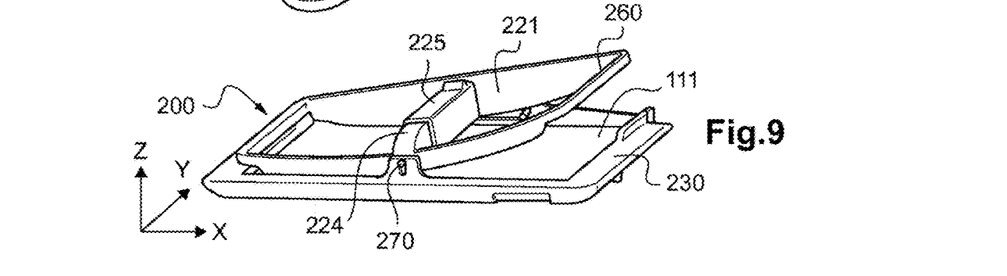
FIG. 9 illustrates the tilting of the spectacle frame support of the apparatus according to the second embodiment of the invention.

In a particularly advantageous manner, as illustrated in FIG. 9, the rotation axis of the frame support 260 is parallel and aligned with the axis Y of the guide rail 224 so as to allow tilting of the spectacle frame about an axis Y passing through the sagittal plane of the spectacle frame 5. In the example illustrated in FIGS. 8 and 9, the rotation pin is formed of two cylindrical pegs 270 fitted in the case 230 and in the frame support 260, the pegs 270 being disposed respectively at the level of the bearing surface 221 and of an end of the guide rail 224. According to the direction of rotation, the frame support 260 makes it possible to bring either the right rim of the frame or the left rim close to the surface of the screen. The tilting movement of the frame support 260 thus makes it possible to reduce or to compensate for the effects of the parallax between a curved frame and the image displayed on the screen. The amplitude of the rotational movement of the frame support 260 lies between +10 and −10 degrees around the rotation pin 270.

In an advantageous manner, the touchscreen makes it possible to detect contact between the frame and the touchscreen when tilting the frame support. The detection of the position of the contact point allows the processing system to automatically detect whether the support of the frame is tilted toward the left rim of the frame or toward the right rim.

Figure 10:
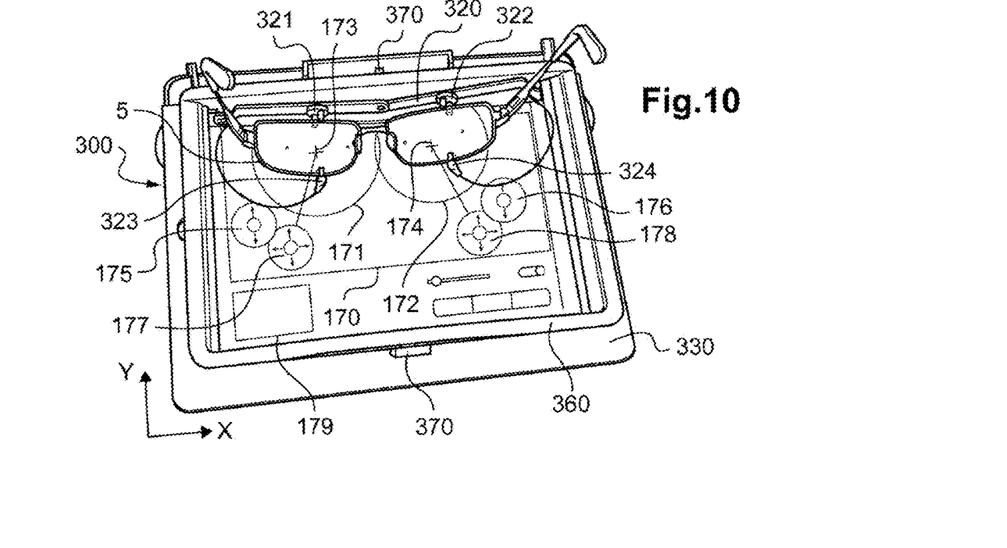
FIG. 10 shows a perspective view of an apparatus for measuring the diameter of the rims of a spectacle frame according to a third embodiment of the invention.

FIG. 10 shows a perspective view of an apparatus for measuring the diameter of the rims of a spectacle frame according to a third embodiment of the invention. This third embodiment differs from the second embodiment by the support of the spectacle frame.

In a manner analogous to the previous embodiments, the checking or measuring apparatus 300 comprises a touch-sensitive tablet with flat screen, and a case 330 fixed on the edges of the tablet so as to present an opening with roughly the dimensions of the screen and a frame support.

The frame support 360 comprises a case on which is fixed a bar 320 which may be rectilinear or formed of two rectilinear sections linked by an articulation. The bar 320 is linked to an assembly of bracing lugs 321, 322 and/or of fixing clamps 323, 324 intended to receive and to hold the spectacle frame 5 in a fixed position with respect to the support 360. By way of example, the fixing clamps 323, 324 are linked to the bar 320 by way of semi-rigid links. The articulation of the bar 320 makes it possible to adapt the frame support to the wrap of the spectacle frame.

In the example illustrated in FIG. 10, the frame support is mounted movable in rotation with respect to the case 330 fixed on the touch-sensitive tablet. The support 360 is mounted movable in rotation about a rotation axis parallel to a median axis Y of the case 330 or of the touch-sensitive tablet. In the example illustrated in FIG. 10, the rotation axis is formed of two cylindrical pegs 370 fitted in the case 330 and in the frame support 360, the pegs 370 being arranged respectively on opposite sides of the case 330.

In another variant, not shown, the frame support 360 may be fixed in a rigid manner on the case 330 fixed on the touch-sensitive tablet.

This third embodiment makes it possible to position the frame with a pantoscopic angle in accordance with the pantoscopic angle measured on an instrument of visioffice type.

This third embodiment makes it possible to leave a large visual opening for the operator facing the touchscreen, the support of the frame not obscuring the central part of the touchscreen.

An image 170 displayed on the touchscreen is observed in FIG. 10. The image 170 illustrates a method for measuring the diameter of the outlines of the rims of the frame, so as to determine the diameter of the lenses intended to be mounted in this spectacle frame.

The image 170 shows a left rim 171 with center 173 and a right rim 172 with center 174. Various touch-sensitive buttons 175-178 appear on the surface of the touchscreen. The touch-sensitive buttons 175, respectively 176, allow the operator, by touch actions of drag-drop type, to modify the diameter of the left rim 171, respectively the diameter of the right rim 172. In an analogous manner, the touch-sensitive buttons 177, respectively 178, allow the operator to modify the position of the center 173 of the left rim 171, respectively the position of the center 174 of the circle of the right rim 172.

The touch interface thus easily allows the operator to center and to adjust the diameter of the rims displayed in the image 170 depending on the outlines of the rims of the frame 5 held in proximity to the screen.

The image 170 shows a single rim for each lens, thus allowing better readability of the diameter for the operator, in comparison to the preprinted charts of the prior art, on which a plurality of concentric rims, which were possibly difficult to distinguish, were shown. The apparatus of the invention, by virtue of the simplicity and the clarity of its graphical interface, thus avoids errors in measuring the diameter of the rims of the frame.

In a particularly advantageous manner, the apparatus 300 makes it possible to calculate the distance between the centers 173 and 174 of the rims and to display this measurement in a zone 179 of the touchscreen, where there also appear, for example, recorded measurements of the wearer's left and right pupillary distance. The device 300 thus allows the operator to verify the compatibility of the measurement of diameter of the lenses with other physiological measurements related to the wearer, without requiring the presence of the wearer.

As a variant, the apparatus also comprises means making it possible to take into account the dihedral angle of the frame and/or the angle of tilt of the frame support. For example, the touchscreen comprises touch-sensitive buttons for selecting: a dihedral angle of the frame of between 0 and 5 degrees, the camber of the lens of for example between a base of 0 and 10 degrees, and/or for indicating an angle of tilt of the support of the frame of 0 degrees, + or −10 degrees.

The image processing system takes into account the information recorded via the touchscreen to correct the displayed image and/or to modulate the measurement of the lens diameters.

Figures 11A, 11B:
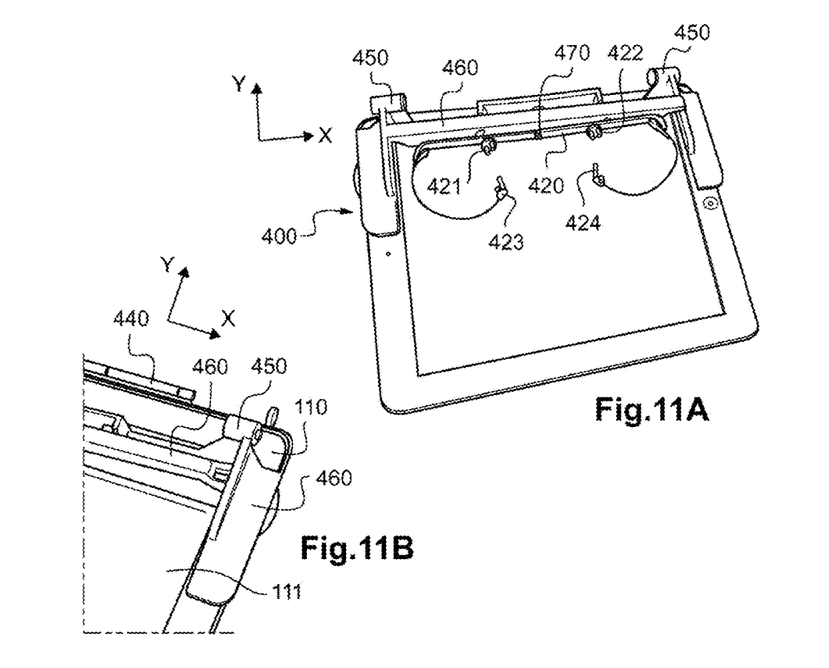

FIGS. 11A-11B show an apparatus for measuring the diameter of the rims of a spectacle frame according to a fourth embodiment of the invention.

In this embodiment, the support of the frame comprises a component 460 on which is fixed a bar 420, which is rectilinear or in two articulated rectilinear sections. As in the previous embodiment, fixing clamps 423, 424 and/or lugs 421, 422, linked to the bar 420, are intended to receive and to hold the rims of a spectacle frame.

The component 460 is linked to another component 440, for example by way of hinges 450, whose fixed part is fastened to the component 440 and whose movable part is fastened to the component 460 and movable in rotation about an axis, for example parallel to the X axis. The assembly consisting of the components 440, 450 and 460 forms a fixing clip or clamp, which is fixed by pinching or magnetically onto the edge of a touch-sensitive tablet 110. Such an accessory offers the advantage of strong ergonomics when mounting and removing an accessory 400 on a touch-sensitive tablet.

The embodiment illustrated in FIG. 11A-11B makes it possible to provide an accessory 400 for a touch-sensitive tablet that is compatible with various sizes of tablets and is easy to install.

The touch-sensitive-tablet accessory 400 preferably comprises three contact points, thereby making it possible to ensure accuracy of positioning and of centering of the frame with respect to the reference datum of the screen of the tablet. These three contact points allow repeatable repositioning of the accessory 400. Thus, it is easier to orient and to center the image correctly.

In a particularly advantageous manner, the support 460 of the spectacle frame can tilt about an axis 470 (see FIG. 11A) from right to left so as to limit the parallax effect. In this case the rotational movement is transformed into a translation of the support so as to be detected and recorded by the touchscreen of the tablet (slider function). Simultaneously, the displayed image is cut by its sagittal plane and expanded in the X direction as a function of the rotation so as to compensate for the projection effect.

In an optional manner, the apparatus makes it possible to position the frame with a pantoscopic angle in accordance with the one measured, for example, on an instrument of visioffice type.

In a fifth embodiment, the apparatus comprises a curved screen. Smartphones or touch-sensitive tablets having a curved screen of concave curvature are already commercially available. For example, mention may be made of OLED screen technologies, which make it possible to manufacture a curved screen.

Figure 12:
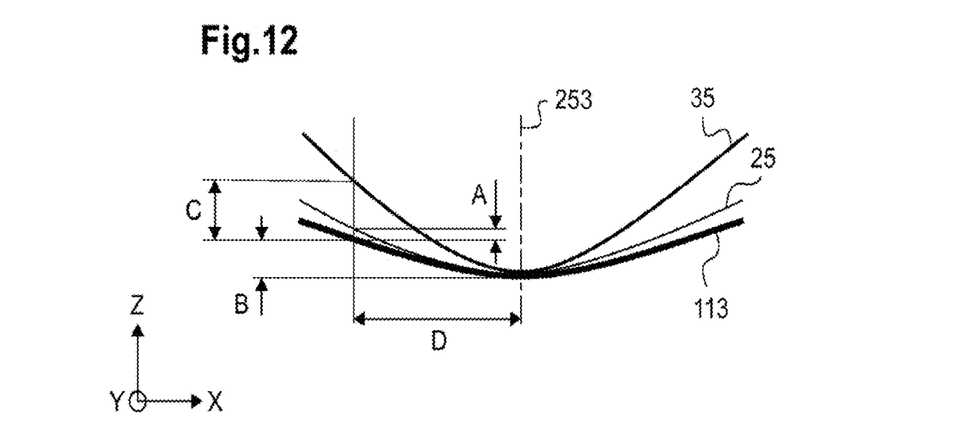
FIG. 12 illustrates a cross-sectional view of a curved screen of an apparatus for measuring the diameter of the lenses according to a fifth embodiment of the invention.

More precisely, the screen 113 has a cylindrical, the axis of this cylinder being parallel to the projection axis Y. The screen 113 thus forms a cylindrical image projection surface.

A spectacle frame 25 or 35 is placed against the curved surface of a screen 113, the sagittal plane 253 of the frame 25, 35 comprising the axis of curvature of the screen 113.

FIG. 12 illustrates a sectional view of a curved screen 113 in a plane XZ that is transverse to the axis of the cylinder of the screen 113. A first spectacle frame 25 has a relatively moderate wrap angle and a second spectacle frame 35 has a more significant wrap angle. Preferably, in the variant illustrated in FIG. 12, the curvature of the screen is less than the curvature of the frames 25, 35.

The median bridge of the frames 25, 35 is placed at the center of the screen 113. The sagittal plane 253 of the frames 25, 35 is transverse to the plane of FIG. 12. The plane of FIG. 12 corresponds almost to the Fraunhofer plane when the user is wearing the spectacle frame 25 or 35.

At a distance D from the sagittal plane 253 of the first frame 25, the distance between the surface of the curved screen 113 and the first frame 25 is equal to A along the projection axis Z. By comparison, the distance between the first frame 25 and a flat screen would be equal to A+B.

Likewise, at the distance D from the sagittal plane 253 of the second frame 35, the distance between the surface of the curved screen 113 and the second frame 35 is equal to C along the projection axis Z. In comparison, the distance between the second frame 35 and a flat screen would be equal to C+B. The curved screen 113 thus makes it possible to reduce the distance by a value B, whatever the curvature of the frame 25, 35. The curved screen 113 therefore makes it possible to reduce parallax errors when determining the diameter of a lens, or when checking the mounting of a lens in a spectacle frame. The curved screen 113 thus makes it possible to increase the accuracy of the mapping between the physical elements attached to the frame or to the lenses and the elements of graphical reference markers displayed on the surface of the curved screen 113.

In an advantageous manner, the algorithm for projecting the images onto the curved screen 113 takes into account the curvature of the screen 113 to compensate for the residual parallax between the surface of the screen and the frame 25, respectively 35.

Figure 13:
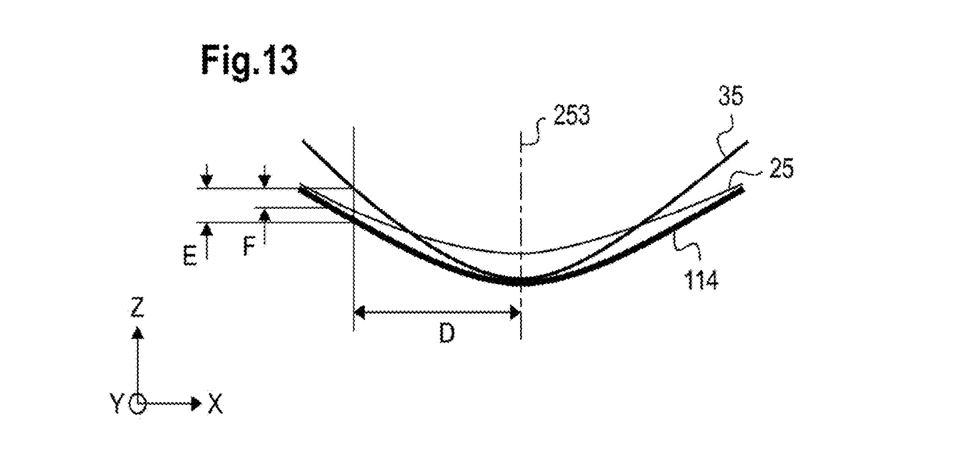
FIG. 13 illustrates a cross-sectional view of a curved screen of an apparatus for measuring the diameter of the lenses according to a variant of the fifth embodiment of the invention.

FIG. 13 illustrates a variant of the fifth embodiment, according to which the cylindrical screen 114 exhibits a curvature equal to an average value of spectacle frame curvature. The spectacle frame 25, respectively 35, is placed against the curved surface of the screen 114. For example, the screen 114 has a curvature that is greater than the curvature of the first frame 25 and less than the curvature of the second frame 35.

At the distance D from the sagittal plane 253 of the first frame 25, the distance between the surface of the curved screen 114 and the first frame 25 is equal to E along the projection axis Z. At the distance D from the sagittal plane 253 of the second frame 35, the distance between the surface of the curved screen 114 and the second frame 35 is equal to F along the projection axis Z. This variant makes it possible to greatly reduce the parallax especially for frames having a very large curvature, such as the second frame 35. Nonetheless, for the first frame 25, the central adjustment zone around the median bridge departs from the surface of the screen 114.

In another variant of this fifth embodiment, the screen is a flexible screen, for example of OLED type. The operator can modify the curvature of the flexible screen as needed, for example to match the curvature of the screen to the curvature of the considered frame. In an advantageous manner in this case, the electronic system detects the actual curvature of the screen so as to adapt the image displayed on the screen depending on the exact shape of the screen.

Methods

The apparatus for measuring the diameter of ophthalmic lenses or for checking the mounting of an ophthalmic compensation lens in a spectacle frame comprises a hardware part, fixed on a touch-sensitive tablet, such as described in relation to the embodiments illustrated in FIGS. 4-13.

The apparatus also comprises software, which makes it possible to obtain the accuracy necessary in measuring the diameter of the rims of a spectacle frame or in checking the mounting of the ophthalmic compensation lenses in a spectacle frame.

Figure 14:
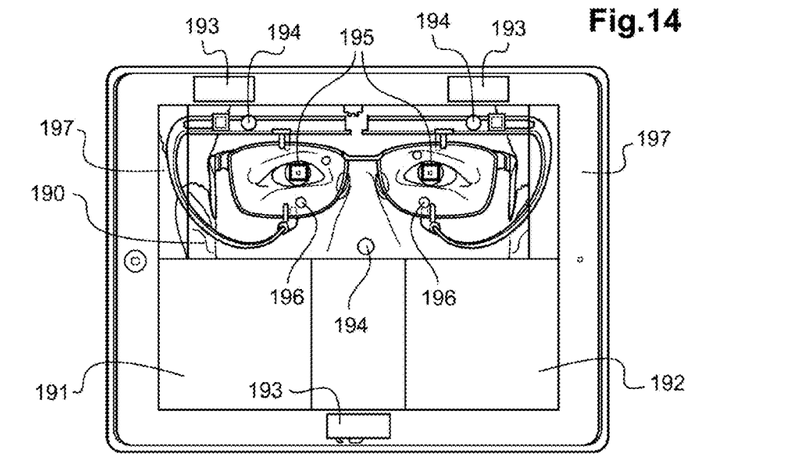
FIG. 14 illustrates a graphical interface of an apparatus for measuring the diameter of the lenses according to one of the embodiments.

A—Method for Measuring the Diameter of Ophthalmic Lenses Intended to be Mounted in a Spectacle Frame FIG. 14 illustrates a graphical software interface for aiding the measurement of the diameter of the lenses by means of an apparatus according to one of the embodiments of the invention, installed on an electronic tablet.

The, for example flat, screen of the tablet forms a plane image.

Now, in general the spectacle frame exhibits a dihedral angle or a curvature and the rims of the frame may also not be inscribed in a plane.

In the transverse direction, in the sagittal plane of the frame, the spectacles may also be inclined depending on an eye-head coefficient of the wearer and/or of the pantoscopic angle of the spectacle frame.

The operator observes the projection of the spectacle frame or of a rim of the spectacle frame on the image displayed on the flat screen.

A first step consists in aligning the image with respect to the frame by image translation and/or rotation operations controlled by contact with the touchscreen.

A second step relates to the processing of parallax errors. The physical angle between the surface of the screen and the frame and/or the rims may induce a parallax error which can lead to errors in reading the lens diameter on the displayed image. In the case where the dihedral angles are non-negligible, and in particular for frames with large dihedron, a tiltable frame support is preferably used, which can pivot to the right and then to the left, so as to bring the right, respectively left rim, close to the surface of the flat screen.

In the embodiment illustrated in FIG. 10, the operator indicates via the touch interface 111, the dihedral angle of the frame and the camber angle of the selected lenses. The dihedral angle can be measured elsewhere, for example on an instrument of Visioffice type. Moreover, if appropriate, the operator indicates whether the frame support is tilted to the side of the right or left rim of the frame. Alternatively, the apparatus obtains this information from a frame database, or via sensors, for example by contact between the touchscreen and the tiltable frame support or the frame.

Thereafter, the image processing system deforms the image displayed one, respectively right or left, half-image at a time depending on the dihedral angle recorded or selected and depending on the pivoting direction of the frame support. For example, the image is deformed by an angular projection of type: L*cos α so as to make up for the angle of projection as a function of the distance L from the sagittal plane of the frame. The displayed image is no longer a perfect circle, but the projection of a circle on a surface.

Thus, the image processing and display software makes it possible to correct for parallax distortion effects.

Figure 15:
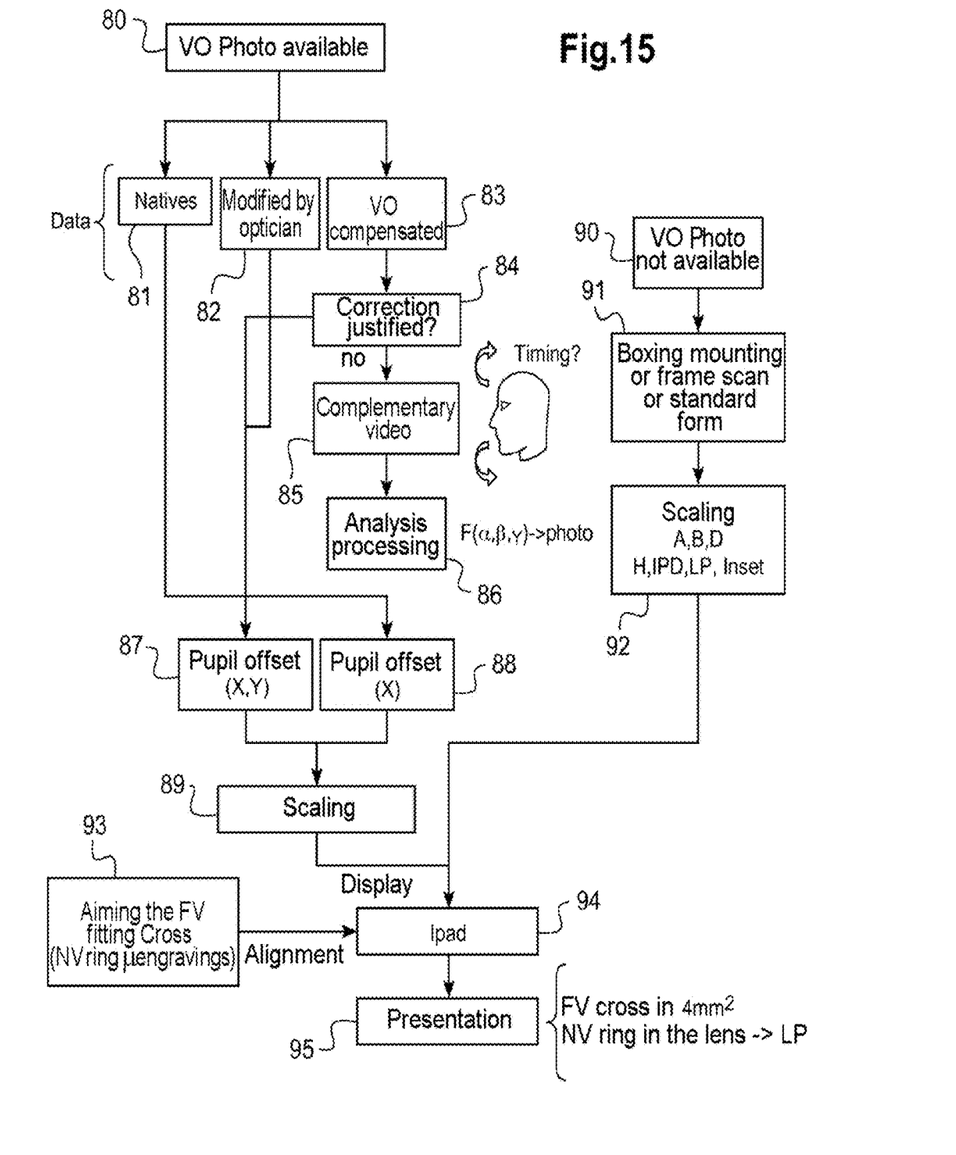
FIG. 15 schematically shows a method for measuring the diameter of the lenses for a frame according to an embodiment of the invention.

B—Method for Checking the Mounting of an Ophthalmic Compensation Lens in a Spectacle Frame FIG. 15 schematically shows the steps of a method for checking the mounting of a lens based on the use of an apparatus and method of the invention.

In a first step, one determines whether an image, a face-on view, of the wearer wearing the demonstration frame is available.

In the case where such an image is available, the method is started in step 80.

In the case where such an image is not available, the method is started in step 90.

B1—Case where a First Image of the Wearer is Available (Steps 80-89)

An image or a video sequence of the face of the wearer wearing the demonstration frame, that is to say without ophthalmic compensation lens, for example taken by means of the video camera of an apparatus of Visioffice type, is recorded (step 80). The plane of acquisition of this image is in general vertical and perpendicular to the sagittal plane of the wearer.

It is possible to use the raw data arising from this image (step 81), or if necessary apply a correction of projection and accuracy effects (steps 82-86).

For example, in the case where the image of the face of the wearer with the frame originates from a Visioffice video camera, the position of the corneal reflections are corrected of possible effects due to convergence of the gaze or to offset in terms of height, either manually by the optician (step 82), or automatically (step 83).

It is verified that the correction applied is justified in step 84. The positional check of the near vision button (65, 66) requires accuracy of alignment at the outline especially so as to avoid aggregating an error in alignment of the monocular-pupillary distances with an error in measuring the bottom of the frame.

A first solution consists in using a frame shape scanned accurately with a plotter and in repositioning the far vision point in this scanned shape so as to verify the theoretical position of the near vision (NV) button.

Alternatively, a new marking of the position of the NV button on the lenses of the frame is performed so as to allow a visual check of the position of the latter inside the rim of the frame.

In step 87, respectively 88, the effects of parallax on the image of the wearer are corrected, by an offset of the position of the pupils in a direction X with respect to the sagittal plane of the wearer and/or in the two directions X and Y (see FIG. 14).

Finally in step 89, the image is scaled, depending on the size and resolution of the screen of the touch-sensitive tablet.

Finally, the scaled image is displayed on the screen of the touch-sensitive tablet (step 94).

FIG. 14 shows an exemplary displayed image, in the zone 190 of the screen of a touch-sensitive tablet. The zones 193 correspond to the three points of fixing of the frame support on the tablet.

The processing system automatically indicates squares 195 (or boxing, system boxes) surrounding the wearer's pupils, as well as centering reference markers 194, and the position of the near vision zones 196.

A part of the touchscreen 191, 192 is assigned to the interactions with the operator to allow, for example, alignment of the image.

The lateral zones 197 allow the operator to shift the displayed image.

B2—Case where a First Image of the Wearer is not Available (Steps 90-92)

If an image of the face of the wearer wearing the frame is not available, the processing system generates an image comprising the frame and the positioning of the wearer's eyes (step 91).

The image of the frame may be generated with the help of a scanned image or of the collection of generic shapes or of a frame database. The positioning of the wearer's eyes is gathered with the help of the centering measurements performed on the wearer.

Next the processing system scales this generated image, depending on the available measurements related to the wearer and to the spectacle frame such as: the mounting height, the wearers inter-pupillary distance and/or the inset of a progressive lens, that is to say the horizontal offset between the reference point for far vision and the reference point for near vision.

Finally, this scaled summary image is displayed on the screen of the touch-sensitive tablet (step 94) (see for example the image displayed in FIG. 6).

Preparation of the Frame Furnished with the Ophthalmic Compensation Lenses (Step 93)

Preferably, after mounting the lenses, a marking of the frame and lenses is performed so as to reveal the microengravings of the frame and the centering points (63, 64), as is a marking of the lenses in far vision and in near vision (as illustrated for example in FIG. 3).

Installing the Frame in the Checking Apparatus on the Screen (Step 95)

For example, in the case where the image of the face of the wearer with the frame originates from a video camera of a Visioffice apparatus.

The frame must be inclined at the pantoscopic angle measured with the Visioffice and available in a shared file.

The invention proposes to make it easier to align the rim of the frame with the frame contained in the image. The frame support can pivot by the pantoscopic angle through a scrolling cursor (slider) of slant type, optionally the scrolling cursor is coded by contact with the touchscreen.

The operator can align the complete displayed image with respect to the real frame via translation and/or rotation movements generated by contact with the touchscreen.

In the case where the dihedral angles are sufficient to generate parallax, in particular for frames with large dihedron, the frame support can pivot to the right and then to the left. In this case, the image is deformed by half depending on the value of the measured dihedron and of the pivoting direction of the frame support, detected for example automatically by contact with the screen.

Optionally, an eyehole for aiding alignment with the corneal reflection is displayed on the screen, for better positioning and centering of this eyehole.

In an optional manner, for a wearer having an inclination of the head (Head-cap) of greater than 5 degrees, the operator mechanically inclines the frame by the same angle on the frame support.

The operator can thus check the position of the graphical reference markers on the displayed image and the position of the physical markings visible on the frame and/or on the lenses so as to check for example the position of the centers of the pupils in far vision with respect to the fitting cross, the position of the near vision buttons, the mounting height of the lenses with respect to the lower edge of the frame, and the alignment of the spectacle frame with respect to the wearer's Frankfurt plane.

In case of an alignment defect, the optician can identify and quantify the manufacturing defect, thereby allowing fast readjustment or correction of the defect.

This method allows both an accurate and complete check of the mounting of ophthalmic compensation lenses on a spectacle frame and does not require the presence of the wearer at the optician's.

In an optional manner, the system comprises ergonomic functions.

In an advantageous manner, depending on access to a database of the chosen lens, the interface of the software presents the maximum lens diameter available in the base. This function makes it possible to identify a lens which corresponds to the chosen frame, and therefore permits a fast check of the feasibility of the equipment.

Let us assume that the evaluated diameter, according to the accuracy allowed by the parallax effect, lies between two discrete values of lens diameters available in practice: for example the diameter of the lens is evaluated as 67 mm whilst the diameters of lenses available in the range are 65 mm or 70 mm. Preferably, the graphical interface of the software displays the outline of the 70 mm compatible diameter in green (or the software issues another equivalent code), this diameter providing a risk free margin of adjustment to mounting. On the contrary if the diameter is close to the exact value of the lens, according to a predefined threshold, the graphical interface of the software displays the diameter of the proposed lens for example in orange (or the software issues another type of alert) allowing the operator to pay the necessary attention to this situation where the mounting tolerances are reduced.

In a preferred embodiment, the frame support is fixed with respect to the tablet (without tilt mode) and the frame support comprises integrated opto-mechanical reference markers. For example, the frame support comprises opto-mechanical reference markers, such as sighting slits and/or holes, distributed in horizontal and vertical transverse directions. These opto-mechanical reference markers make it possible to guide the operator's gaze and to sight corresponding graphical reference markers inlaid in the image displayed on the screen. The opto-mechanical reference markers of the frame support cooperate with the graphical reference markers of the image so as to allow the operator to position himself facing the screen during the measurement, thus making it possible to fix the sighting axis, to predict the influence of parallax and therefore to compensate for it.

The invention claimed is:

1. An apparatus for determining the diameter of an ophthalmic compensation lens intended to be mounted in a spectacle frame or for checking the mounting of an ophthalmic compensation lens in a spectacle frame, wherein the apparatus comprises:

an electronic tablet having a screen, a spectacle frame support, the spectacle frame support exhibiting an opening and being suitable for holding said spectacle frame in a determined position, a face of the spectacle frame being placed in the vicinity of the surface of the screen, and means for storing at least one graphical image comprising at least one graphical reference marker associated with the ophthalmic compensation lens and/or the patient intended to wear the ophthalmic compensation lens mounted in said frame;

means for processing said image which are suitable for deforming the image displayed one half-image at a time, respectively right or left, as a function of a distance L from the sagittal plane of the frame for generating a projected image;

means for displaying said projected image on the screen, and means for aligning said frame in relation to the projected image displayed on the screen, said electronic display means being configured to allow an operator to visually determine a diameter of lens intended to be mounted in said spectacle frame by projecting at least one rim of the frame via said opening in relation to the position of the at least one corresponding graphical reference marker in the projected image displayed on the screen or to visually check the mounting of an ophthalmic compensation lens in said spectacle frame by projecting a physical reference marker associated with the lens mounted in said frame in relation to the position of the at least one corresponding graphical reference marker in the projected image displayed on the screen.

2. The apparatus for determining the diameter of a lens or for checking the mounting of a lens on a spectacle frame as claimed in claim 1, further comprising a fixing device linked mechanically to the spectacle frame support, the fixing device comprising a fixing clamp intended to be fixed on an edge of the electronic tablet or a case suitable for surrounding the electronic tablet, the case comprising an opening facing the screen of the electronic tablet.

3. The apparatus for determining the diameter of a lens or for checking the mounting of a lens on a spectacle frame as claimed in claim 1, wherein the spectacle frame support is fixed with respect to the screen, and the alignment means comprise image processing means suitable for modifying the displayed graphical image so as to correct a parallax error between the projection of the frame through the opening and the graphical image displayed on the screen.

4. The apparatus for determining the diameter of a lens or for checking the mounting of a lens on a spectacle frame as claimed in claim 3, wherein the spectacle frame support comprises opto-mechanical alignment reference markers and the electronic display means are configured to display corresponding alignment graphical reference markers in the image displayed on the screen.

5. The apparatus for determining the diameter of a lens or for checking the mounting of a lens on a spectacle frame as claimed in claim 4, wherein the screen is a flat screen, a curved screen having an outwardly concave curvature or a flexible screen.

6. The apparatus for determining the diameter of a lens or for checking the mounting of a lens on a spectacle frame as claimed in claim 4, wherein the spectacle frame support comprises a plurality of fixing clamps or lugs intended to receive and to hold the spectacle frame.

7. The apparatus for determining the diameter of a lens or for checking the mounting of a lens on a spectacle frame as claimed in claim 4, wherein the spectacle frame support comprises a bearing surface and a movable component suitable for bearing against a median bridge of said spectacle frame and so that a face of said spectacle frame comes into contact with said bearing surface, the spectacle frame being held by pressure between the movable component and the bearing surface.

8. The apparatus for determining the diameter of a lens or for checking the mounting of a lens on a spectacle frame as claimed in claim 1, wherein the spectacle frame support is mounted movable in rotation about an axis parallel to the screen, so as to reduce a parallax error between the portion of the frame and the displayed image.

9. The apparatus for determining the diameter of a lens or for checking the mounting of a lens on a spectacle frame as claimed in claim 1, wherein the screen is a flat screen, a curved screen having an outwardly concave curvature or a flexible screen.

10. The apparatus for determining the diameter of a lens or for checking the mounting of a lens on a spectacle frame as claimed in claim 1, wherein the spectacle frame support comprises a plurality of fixing clamps or lugs intended to receive and to hold the spectacle frame.

11. The apparatus for determining the diameter of a lens or for checking the mounting of a lens on a spectacle frame as claimed in claim 1, wherein the spectacle frame support comprises a bearing surface and a movable component suitable for bearing against a median bridge of said spectacle frame and so that a face of said spectacle frame comes into contact with said bearing surface, the spectacle frame being held by pressure between the movable component and the bearing surface.

12. A method for determining the diameter of an ophthalmic compensation lens intended to be mounted in a spectacle frame, the method comprising the following steps:

arranging a spectacle frame in a predetermined position on a spectacle frame support of an apparatus as claimed in claim 1;

displaying on the screen of the electronic tablet at least one projected image obtained by processing a graphical image of a lens outline of determined diameter and determined position so as to deform the graphical image displayed one half-image at a time, respectively right or left, as a function of a distance L from the sagittal plane of the frame;

visually comparing by projection a rim of said frame and the projected image of the lens outline displayed on the screen of the electronic tablet;

deducing therefrom a diameter of ophthalmic compensation lens intended to be mounted on said spectacle frame.

13. An electronic tablet accessory for determining the diameter of a lens intended to be mounted in a spectacle frame or for checking the mounting of a lens in a spectacle frame, said accessory comprising:

a fixing device intended to be fixed on an electronic tablet having a flat screen; and a spectacle frame support linked mechanically to the fixing device, the spectacle frame support being suitable for holding said spectacle frame in a fixed position in the vicinity of the flat screen, the fixing device and the spectacle frame support having at least one opening between a rim of said frame in said fixed position, and the surface of the flat screen, when the fixing device is fixed on the electronic tablet, said opening being suitable for allowing an operator to view a graphical image displayed on the flat screen of the tablet by projection through said opening, so as to determine the diameter of a lens intended to be mounted in a rim of said spectacle frame or to check the mounting of a lens in said spectacle frame.

14. The accessory as claimed in claim 13, further comprising means for rotating the frame support around one or two directions of the surface of the flat screen.

15. A procedure for checking the mounting of at least one ophthalmic compensation lens in a spectacle frame, said lens comprising at least one physical marking, the checking procedure comprising the following steps:
   recording at least one digital image comprising at least one graphical reference marker representative of a face-on view of the ophthalmic compensation lens and/or of the patient intended to wear the ophthalmic compensation lens mounted in said frame;
   digital processing of said image, suitable for deforming the graphical image displayed one half-image at a time, respectively right or left, as a function of the distance L from the sagittal plane of the frame generating a projected image;
   displaying said projected image on a digital tablet screen;
   positioning the frame comprising said at least one ophthalmic compensation lens, a face of the lens being placed on the surface of the screen of the tablet; and
   aligning said frame in relation to the projected image displayed on the screen so as to allow a visual check of the position of the at least one physical marking by projection in relation to the position of the at least one corresponding graphical reference marker in the projected image displayed on the screen.

16. The checking procedure as claimed in claim 15, wherein said at least one digital image is a photographic image of the patient wearing the spectacle frame and the at least one graphical reference marker comprises a graphical reference marker from among: a position of corneal reflection, a line passing through the centers of the two eyes, a near vision zone, a far vision point, a progressive lens corridor, a horizontal line, and an optical center.

17. The checking procedure as claimed in claim 15, wherein said at least one digital image comprises a template for checking the dimension of the lens and/or the shape of the outline of the lens, an image of the spatial distribution of refractive power of the ophthalmic compensation lens and/or an image of the spatial distribution of distortion of the ophthalmic compensation lens.

18. The checking procedure as claimed in claim 15, further comprising a step of displaying a graphical tool by superposition on the displayed projected image, the graphical tool being suitable for allowing a distance between the position of the at least one manufacturing marking and the position of the at least one corresponding graphical reference marker in the projected image displayed on the screen to be evaluated.

19. The checking procedure as claimed in claim 15, further comprising an additional step of recording a result of said check preferably in the form of a recording of an image of the frame comprising the ophthalmic compensation lens and the manufacturing markings, the frame being positioned on the screen of the digital tablet displaying the projected image and the at least one corresponding graphical reference marker.

20. The checking procedure as claimed in claim 15, wherein the frame comprises two ophthalmic compensation lenses and the checking procedure is applied simultaneously to the two lenses or successively to each of the two lenses.

* * * * *